Sept. 13, 1927.
W. M. BOLT
SPRING
Filed June 23, 1926
1,642,638
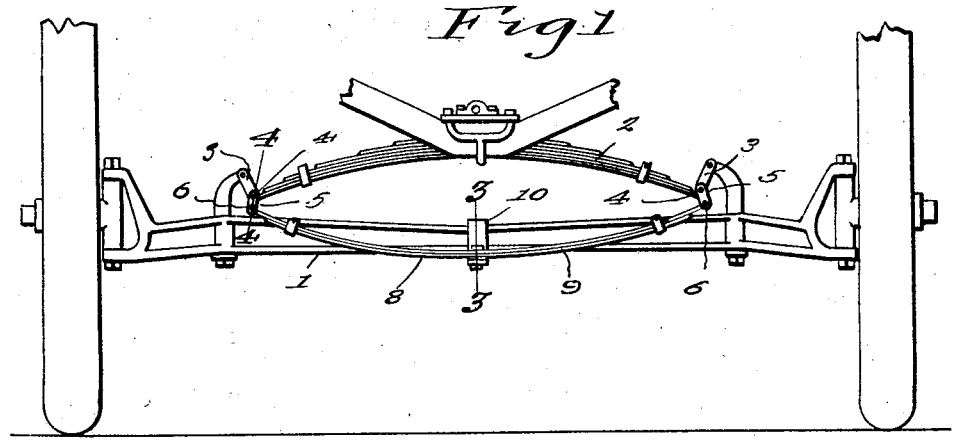
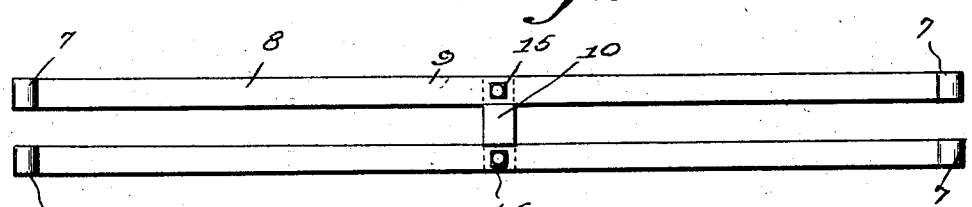
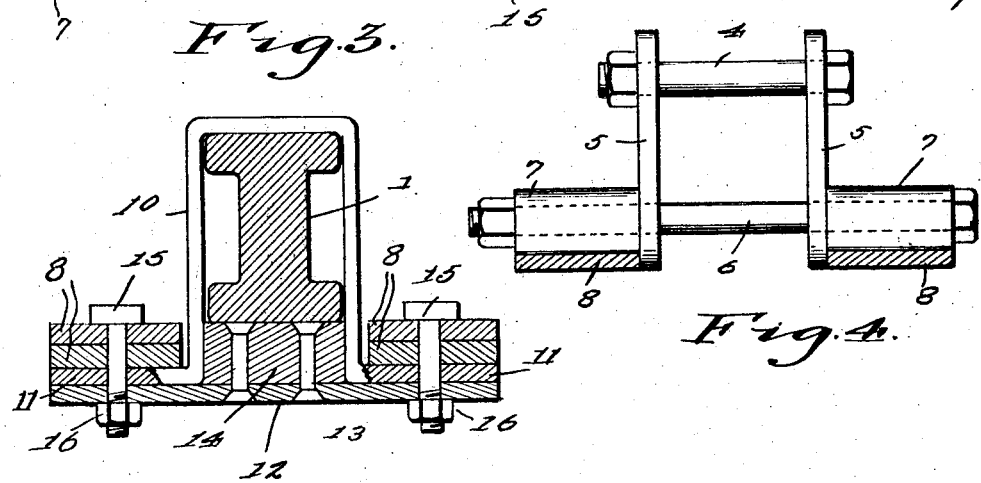
W. M. Bolt INVENTOR
BY *Victor J. Evans*
ATTORNEY Patented Sept. 13, 1927.

1,642,638

UNITED STATES PATENT OFFICE.

WILLIAM M. BOLT, OF WHITE SULPHUR SPRINGS, WEST VIRGINIA.

SPRING.

Application filed June 23, 1926. Serial No. 118,104.

My present invention has references to a body spring for the small type of automobiles known as the Ford, and my object is the provision of auxiliary or supplemental springs for the front of a Ford automobile which may be attached thereto without altering any of the parts of the machine and which includes two leaf spring members, arranged on the opposite sides of the front axle of the machine, centrally connected together and to the said front axle and having their ends connected to links or shackles which are pivotally supported from the shackle bolt of the main front spring, and whereby to produce an auxiliary spring that serves as a shock absorber and snubber, a device which will prevent the breaking of the original spring as well as which will prevent said original spring from swaying forward or backward, and also a device which enables the car to make better time with a greater amount of safety.

To the attainment of the foregoing and other objects which will present themselves as the nature of the invention is better understood, the improvement, resides in the novel features of construction, combination and operative association of parts, a satisfactory embodiment of which is illustrated by the drawings which accompany and form part of this application.

In the drawings:

Figure 1 is a view of a sufficient portion of the front of an automobile to illustrate the application of my improvement thereon.

Figure 2 is a top plan view of the improvement.

Figure 3 is a sectional view on the line 3—3 of Figure 1.

Figure 4 is a sectional view on the line 4—4 of Figure 1.

The front axle of an automobile of the Ford type, is indicated in the drawing by the numeral 1, and the shackles which connect the front spring 2 to the axle, by the numerals 3. In carrying out my invention I attach to the ends of the shackle bolts 4 shackles or links 5. Passing through openings in the lower ends of each pair of oppositely arranged links 5 there is a comparatively long bolt 6. This bolt is received through eyes 7 formed on the ends of the longer leaves 8 of the auxiliary springs 9. Preferably each auxiliary or body spring 9 is made up of two leaves connected together by clips, and one of the leaf springs is arranged on each side of the axle 1.

Straddling the axle at the center thereof, there is a yoke 10. The parallel arms of the substantially U-shaped yoke 10 have their ends formed with outstanding flanges 11. Underlying these flanges there is a plate 12. Fixed on the center of the plate by means 13 there is a block 14. This block is received between the arms of the yoke 10 and underlies and contacts with the front axle 1. The leaf springs 9 are arranged over the flanges 11 of the yoke 10, and passing through these springs, the flanges 11 and the plate 12, there are bolts 15 which are engaged by suitable nuts 16.

My body or auxiliary spring may be easily attached to an automobile of the Ford type without altering any of the parts thereof. The spring not only serves as a snubber for absorbing any shocks and jars to which the automobile may be subjected, but also serves as a means for preventing the breakage of the original spring 2. In addition to this the improvement prevents the spring 2 from swaying forward or backward and enables the car to travel at a high rate of speed and with more safety than is usual.

Having described the invention, I claim:—

The combination with the front of an automobile of the Ford type, of links secured to the opposite sides of the spring shackles at the said front of the automobile, comparatively long bolts passing through each pairs of links, leaf springs arranged on the opposite sides of the front axle and having their ends connected to the last mentioned bolts, a U-shaped yoke disposed centrally over the front axle and having outstanding ends on which the center of the auxiliary springs rest, a plate arranged beneath the yoke, a block carried by the plate, received in the yoke and contacting the under face of the front axle and removable means securing the auxiliary springs and the plate to the angle ends of the yoke.

In testimony whereof I affix my signature.

WILLIAM M. BOLT.